July 29, 1952
J. NEWCOMBE
2,605,287
HYDROLYSIS OF METHYLAL
Filed Aug. 24, 1950
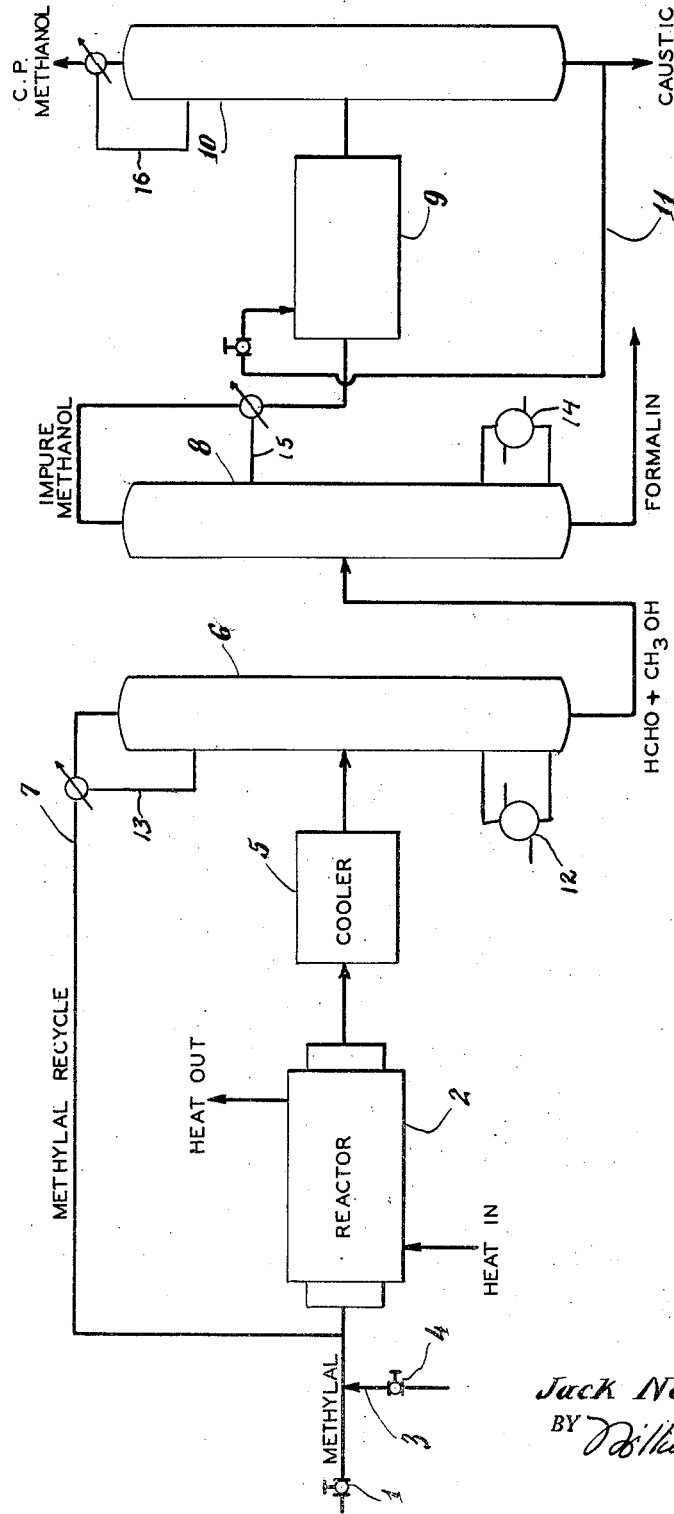
INVENTOR.
Jack Newcombe
BY
ATTORNEY.

Patented July 29, 1952

2,605,287

UNITED STATES PATENT OFFICE 2,605,287

HYDROLYSIS OF METHYLAL

Jack Newcombe, Pawhuska, Okla., assignor to Cities Service Oil Company, Bartlesville, Okla., a corporation of Delaware Application August 24, 1950, Serial No. 181,181

6 Claims. (Cl. 260—606)

This invention relates to improvements in the hydrolysis of methylal and more particularly to the catalytic hydrolysis of methylal in the vapor phase.

This application is a continuation in part of my copending application Serial No. 76,589 filed February 15, 1949, now abandoned.

In processes for the production of oxygenated compounds from light hydrocarbons such as ethane-rich or wet natural gas, propane, butane, or mixtures thereof, or mixed hydrocarbons in the $C_2$ to $C_4$ range such as are found in refinery off-gases, both methanol and formaldehyde are produced during the reaction and some condensation to methylal takes place in the chemical crude. This methylal must be removed from the oxidation products in the course of processing them into their purified components. Very little use is found for methylal as such, and it is consequently treated more or less as a by-product, with a consequent low value.

It is an object of this invention to effect the hydrolysis of methylal into its component parts, and to recover substantially pure methanol and formaldehyde.

According to my process, a methylal-water mixture is hydrolyzed, at temperatures in excess of 130° C., in the presence of selected catalysts. The methylal feed to the process may be pure, or may consist of a methylal-methanol mixture containing about 8 per cent methanol, such as would be obtained by distilling methylal from a solution containing excess methanol. By controlling the ratio of water to methylal, I have found that I can recover, by fractionation of the hydrolysis products, methanol of high purity as an overhead product, and a formaldehyde solution of U. S. P. quality and of any desired strength, as a bottoms product. Preferably, I control the water-methylal ratio to recover a formaldehyde solution containing from 41 to 43 per cent by weight of formaldehyde, which may be readily cut back to the standard 37 per cent solution of commerce by the addition of water or methanol. When operating at temperatures above about 225° C., I have found that up to about 98 per cent of the methylal charged may be hydrolyzed per pass through the reactor.

The methanol recovered as the overhead product is sufficiently pure for use in any process in which a C. P. methanol is unnecessary, but, if a pure methanol is desired, it may be subjected to further finishing treatment to produce a C. P. methanol. For example, it may be treated with caustic solution to condense the impurities present, followed by a distillation to recover a C. P. methanol.

I have found that substances showing catalytic action in promoting the methylal hydrolysis reaction include activated charcoal, phosphoric acid treated charcoal, and sulfuric acid treated charcoal. Of these, however, the phosphoric acid treated charcoal appears to be by far the best, since it shows far greater catalytic activity than the others, and the products recovered are not off-odorous. Activated charcoal and sulfuric acid treated charcoal exhibit less catalytic activity, and the products recovered after hydrolysis with the sulfuric acid treated catalyst tend to have an off-odor.

The phosphoric acid treated catalyst may be prepared by soaking activated charcoal in concentrated phosphoric acid for a period of from five to twenty hours, followed by leaching with steam or water to remove excess phosphoric acid. It may thereafter be dried, in order to facilitate packing it in the reactor, but the drying step is not generally necessary. The sulfuric acid treated charcoal catalyst may be prepared in a similar manner.

I have found that only a small percentage of the methylal charge is hydrolyzed per pass in my process at temperatures below 130° C. As the temperature is increased above that value, the process becomes progressively more efficient. It is therefore necessary, in order to recover formaldhyde solutions of commercial strength, to use low molar ratios of water to methylal when operating at lower temperatures. At higher temperatures, it is possible to use larger proportions of water to methylal in order to obtain the desired formalin concentration. Generally, at lower temperatures the proportion of water to methylal should be from about 0.5 to 1 to about 1 to 1; at higher temperatures the proportion should be from about 2 to 1 to about 4 to 1, as will be more particularly shown in connection with the examples and tables hereinafter set forth.

As will be observed from the accompanying drawing, in which the figure is a diagrammatic flow sheet of the process, methylal is continuously introduced through line 1 into an externally heated reactor 2 packed throughout its length with one of my selected catalysts, in which the temperature of the feed stream is raised to a temperature in excess of 130° C., and preferably to from about 225° C. to about 300° C. Water in the desired ratio, preferably in the form of steam, in introduced into the methylal feed through line 3, a control valve 4 being provided to regulate the flow through line 3.

After undergoing hydrolysis in the reactor 2 the effluent gases are passed to a cooler 5, where they may be completely condensed, or where only those components of the stream boiling above the methylal range may be condensed. Alternatively, the cooling may be omitted, the effluent gases being passed directly to a fractionating column 6 which may be provided with a reboiler 12. In practice, however, the cooling step is desirable since it permits the use of a smaller column 6 than would be possible if the step were omitted.

The products, including the condensate, are then passed to the column 6 in which the unreacted methylal is taken off overhead as a methylal-methanol azeotrope, and returned in vapor phase to the process through recycle line 7, reflux being provided through line 13. A bottoms product containing water, formaldehyde, and methanol is removed from the column 6 and is led to another column 8 also provided with a reboiler 14 and reflux line 15 where the methanol content is taken off as an overhead product and an aqueous solution of formaldehyde of high purity is recovered as a bottoms product.

Under ordinary conditions of fractionation, the methanol thus obtained is relatively pure, and may be used in processes in which methanol of C. P. grade is not required. It may, however, contain traces of methylal or formaldehyde as impurities. If a C. P. methanol is desired, further finishing treatments may be employed. For example, the methanol may be then passed into a caustic solution in a treater 9 where the impurities are condensed, by action of the caustic, into condensation products of high boiling point. The mixture from the caustic treater 9 is then passed to another column 10 provided with reflux line 16 in which a C. P. methanol is fractionated from the caustic solution and the caustic, containing condensation products, is taken off as a bottoms product and led to waste or other disposal. The caustic may, of course, be recycled to the caustic treater through line 11 until its content of condensation products builds up to the point at which they tend to drop out in solid phase and clog the apparatus.

In order that those skilled in the art may more fully appreciate my invention, and the conditions under which it is carried out, the following examples are given.

EXAMPLE I

A quantity of methanol-free methylal and water, corresponding to a molar ratio of about 1.5:1 of water to methylal was passed in the vapor state through a reactor, containing a packing of phosphoric acid treated charcoal, at a temperature of 131-133° C. The effluent from the reactor was condensed and subjected to fractionation to recover unreacted methylal. It was found that under these conditions 35.6 per cent of the methylal had been hydrolyzed leaving 64.4 per cent of the methylal charge for recycling. Upon fractionation of the residue from the methylal fractionation, methanol of good quality was taken overhead, and a bottoms product containing 29.9 per cent formaldehyde of U. S. P. grade was obtained.

EXAMPLE II

Since in commercial processes any methylal recovered for further processing will generally be in the form of a methylal-methanol azeotrope containing about 8 per cent of methanol a quantity of such a mixture together with water corresponding to a 1:1 molar ratio of water to methylal, was vaporized and passed through phosphoric acid treated charcoal catalyst as above at a temperature of from 166-168° C. The effluent was condensed and fractionated to recover unreacted methylal. It was found that 40.1 per cent of the methylal had been hydrolyzed, 59.9 per cent being recovered as an overhead product. The residue from this distillation was then refractionated to remove methanol as an overhead product. A bottoms product containing 46.2 per cent by weight of formaldehyde of U. S. P. grade was recovered.

EXAMPLE III

A quantity of methylal containing methanol as in the preceding example, together with water corresponding to a molar ratio of water to methylal of 1.4:1 was vaporized and passed over phosphoric acid treated charcoal catalyst in the same manner as described above, at a temperature of 166-168° C. Upon fractionating and refractionating the effluent, it was found that under these conditions 49 per cent of the methylal charged to the reactor had been hydrolyzed and a bottoms product from the second fractionation containing 35.4 per cent formaldehyde in aqueous solution in highly purified form was obtained.

EXAMPLE IV

A quantity of methylal-methanol azeotrope containing about 8 per cent methanol together with water corresponding to a ratio of water to methylal of 3.69 to 1 was passed in vapor phase through the reactor over the same catalyst as in the preceding examples at a temperature of about 187° C. It was found that 84.4 per cent of the methylal had been hydrolyzed and a bottoms product from the second fractionation containing 33.1 per cent formaldehyde of U. S. P. grade was obtained.

EXAMPLE V

A quantity of the methylal-methanol mixture of Example IV together with water corresponding to a 3.15 to 1 ratio of water to methylal was passed through the same catalyst as in the preceding examples at a temperature of 282° C. Upon fractionation it was found that 97.9 per cent of the methylal charged had been hydrolyzed and a formaldehyde solution was obtained as a bottoms product from the second fractionation containing 42.9 per cent U. S. P. grade formaldehyde. It is thus obvious that at higher temperatures the hydrolysis is almost quantitative, and a formaldehyde solution of the desired commercial percentage may be obtained.

Several other runs under varying conditions were made, the results of which may be summarized in the following table.

Table I

| Percent HCHO in formalin recovered | Molar Ratio Water to Methylal | Temp. of Hydrolysis °C. | Catalyst | Weight Percent Methylal Converted |
|---|---|---|---|---|
| Not determined | 2:1 | 155 | Activated Charcoal | 24 |
| Do | 2:1 | 155 | Phosphoric Acid Treated Charcoal | 47 |
| Do | 2:1 | 155 | None (Berl Saddle Packing) | 0 |
| 27.3 | 2:1 | 131–133 | Phosphoric Acid Treated Charcoal | 37.2 |
| 32.5 | 1.5:1 | 166–167 | ...do... | 48.7 |
| 30.5 | 2:1 | 161–165 | ...do... | 56.3 |
| 46.2 | 1:1 | 188–190 | ...do... | 54.0 |
| 38.8 | 1.6:1 | 188–190 | ...do... | 57.7 |
| 41.6 | 2.24:1 | 186 | ...do... | 67.0 |
| 43.3 | 2.67:1 | 187 | ...do... | 81.1 |
| 44.5 | 3.28:1 | 216 | ...do... | 93.8 |
| 41.1 | 3.26:1 | 224 | ...do... | 95.3 |
| 42.6 | 3.14:1 | 255 | ...do... | 96.1 |
| 27.9 | 3.76:1 | 280 | Sulphuric Acid Treated Charcoal | 70.5 |
| 32.2 | 3.05:1 | 280 | ...do... | 70.4 |
| 11.0 | 3.19:1 | 193 | ...do... | 22.8 |

The formaldehyde solution obtained in all runs by my new and improved process when using phosphoric acid treated charcoal had the odor of U. S. P. formalin, and was neutral to aurin indicator which indicates the absence of free acids. The formaldehyde solution obtained gave no color when mixed with an equal volume of concentrated sulfuric acid. The methanol recovered by distillation from the formaldehyde-methanol solution had a clean alcohol odor and a sulfuric acid color of 0.05 per cent apparent dimethyl acetal or less, being sufficiently pure for most uses not requiring a C. P. methanol. After treatment with caustic and refractionation, the alcohol had no sulfuric acid color and had a clean alcohol odor, corresponding in every respect to a C. P. methanol.

I have thus succeeded in continuously hydrolyzing methylal into methanol and formaldehyde, in good yield, and have succeeded in recovering directly from the products of the hydrolysis a substantially pure formaldehyde solution of the strength of commercial formalin, together with a substantially pure methanol.

Having now described my invention, what I claim as new and useful is:

1. The process of producing formaldehyde and methanol including continuously introducing a feed stock comprising methylal and water in the ratio of from about two mols to about four mols of water to one mol of methylal in the vapor phase into a reaction zone in the presence of phosphoric acid treated activated charcoal at a temperature of from about 190° C. to about 285° C., continuously removing a reaction product from the reaction zone, separating unhydrolyzed methylal from the reaction product, and fractionating the reaction product to recover a substantially pure methanol as an overhead product, and a substantially pure aqueous solution of formaldehyde as a bottoms product.

2. The process according to claim 1 in which the feed stock consists essentially of methylal and water.

3. The process according to claim 1 in which the feed stock consists essentially of methylal, methanol, and water.

4. The process of hydrolyzing methylal including continuously introducing a feed stock containing methylal and water into a reactor in the presence of a catalyst selected from the group consisting of activated charcoal and phosphoric acid treated activated charcoal at a temperature in excess of about 130° C., continuously removing a reaction product from the reactor, fractionating unhydrolyzed methylal from the reaction product, adding water to the recovered methylal, recycling the methylal-water mixture to the reactor, subjecting the bottoms product from the methylal fractionation to a further fractionation and recovering methanol as an overhead product and an aqueous solution of formaldehyde as a bottoms product.

5. The process of producing formaldehyde and methanol including continuously introducing a feed stock comprising methylal and water in the ratio of from about one mol to about three mols of water to one mol of methylal into a reaction zone in the presence of a catalyst selected from the group consisting of activated charcoal and phosphoric acid treated activated charcoal at a temperature of from about 130° C. to about 190° C., continuously removing a reaction product from the reaction zone, separating unreacted methylal from the reaction product, recycling the unreacted methylal to the system, and treating the remainder of the reaction product to recover a substantially pure methanol as an overhead product, and a substantially pure aqueous solution of formaldehyde as a bottoms product.

6. The process according to claim 5 in which the catalyst is phosphoric acid treated activated charcoal.

JACK NEWCOMBE.

REFERENCES CITED

The following references are of record in the file of this patent:

UNITED STATES PATENTS

| Number | Name | Date |
|---|---|---|
| 1,566,819 | Carter | Dec. 22, 1925 |
| 2,537,169 | Stautzenberger et al. | Jan. 9, 1951 |

FOREIGN PATENTS

| Number | Country | Date |
|---|---|---|
| 513,772 | Great Britain | Oct. 20, 1939 |